(12) United States Patent
Brune et al.

(10) Patent No.: US 10,107,091 B2
(45) Date of Patent: Oct. 23, 2018

(54) FLUX PLANE LOCATING IN AN UNDERGROUND DRILLING SYSTEM

(71) Applicant: Merlin Technology Inc., Kent, WA (US)

(72) Inventors: Guenter W. Brune, Bellevue, WA (US); Albert W. Chau, Woodinville, WA (US); John E. Mercer, Gig Harbor, WA (US)

(73) Assignee: Merlin Technology Inc., Kent, WA (US)

( * ) Notice: Subject to any disclaimer, the term of this patent is extended or adjusted under 35 U.S.C. 154(b) by 0 days.

(21) Appl. No.: 15/611,429

(22) Filed: Jun. 1, 2017

(65) Prior Publication Data

US 2017/0268329 A1    Sep. 21, 2017

Related U.S. Application Data

(60) Continuation of application No. 15/352,363, filed on Nov. 15, 2016, now Pat. No. 9,683,436, which is a
(Continued)

(51) Int. Cl.
   *G01V 3/08*    (2006.01)
   *G01V 3/11*    (2006.01)
   (Continued)

(52) U.S. Cl.
   CPC ........ *E21B 47/0905* (2013.01); *E21B 47/024* (2013.01); *G01C 9/02* (2013.01);
   (Continued)

(58) Field of Classification Search
   CPC ..... E21B 47/02224; E21B 7/024; G01V 3/08; G01V 3/15
   (Continued)

(56) References Cited

U.S. PATENT DOCUMENTS

| 2,291,450 A | 7/1942 | Case |
| 4,314,251 A | 2/1982 | Raab |

(Continued)

OTHER PUBLICATIONS

Radiodetection Corp., Drill Track System 1 User Guide, Rev 1, Aug. 1997, Radiodetection Corp. Product User Guide.
(Continued)

*Primary Examiner* — Reena Aurora
(74) *Attorney, Agent, or Firm* — Pritzkau Patent Group, LLC (57) ABSTRACT

A portable locator and method for establishing the location of the cable line in a region which includes at least one generally straight electrically conductive cable line extending across the region from which cable line a locating signal includes a first arrangement for measuring a local flux intensity of the locating signal at a first above ground point within the region with the portable locator in a particular orientation at the first above ground point. A second arrangement uses the local flux intensity to establish a cable line angular orientation which limits the possible directions to the cable line relative to the particular orientation of the portable locator at the above ground point. A third arrangement uses the measured local flux intensity to establish an actual direction of the cable line that is selected from the possible directions based on certain characteristics of the locating signal.

5 Claims, 6 Drawing Sheets

Related U.S. Application Data continuation of application No. 15/056,178, filed on Feb. 29, 2016, now Pat. No. 9,519,074, which is a continuation of application No. 14/174,176, filed on Feb. 6, 2014, now Pat. No. 9,291,738, which is a continuation of application No. 13/095,729, filed on Apr. 27, 2011, now Pat. No. 8,680,864, which is a continuation of application No. 12/822,537, filed on Jun. 24, 2010, now Pat. No. 7,956,614, which is a continuation of application No. 12/646,243, filed on Dec. 23, 2009, now Pat. No. 7,768,265, which is a division of application No. 11/924,508, filed on Oct. 25, 2007, now Pat. No. 7,663,371, which is a division of application No. 11/619,851, filed on Jan. 4, 2007, now Pat. No. 7,304,479, which is a continuation of application No. 11/165,888, filed on Jun. 24, 2005, now Pat. No. 7,176,690, which is a continuation of application No. 10/828,391, filed on Apr. 19, 2004, now Pat. No. 6,963,201, which is a continuation of application No. 10/393,845, filed on Mar. 21, 2003, now Pat. No. 6,768,307, which is a continuation of application No. 10/285,139, filed on Oct. 30, 2002, now Pat. No. 6,653,837, which is a continuation of application No. 09/641,006, filed on Aug. 17, 2000, now Pat. No. 6,496,006.

(51) Int. Cl.
| | |
|---|---|
| *E21B 47/09* | (2012.01) |
| *E21B 47/024* | (2006.01) |
| *G01V 3/15* | (2006.01) |
| *G01C 9/02* | (2006.01) |
| *G01V 3/165* | (2006.01) |
| *G01V 3/28* | (2006.01) |

(52) U.S. Cl.
CPC .................. *G01V 3/08* (2013.01); *G01V 3/15* (2013.01); *G01V 3/165* (2013.01); *G01V 3/28* (2013.01)

(58) Field of Classification Search
USPC .................................................. 324/326, 67
See application file for complete search history.

(56) References Cited

U.S. PATENT DOCUMENTS

| | | |
|---|---|---|
| 4,346,384 A | 8/1982 | Raab |
| 4,387,340 A | 6/1983 | Peterman |
| 4,646,277 A | 2/1987 | Bridges |
| 4,710,708 A | 12/1987 | Rorden et al. |
| 4,806,869 A | 2/1989 | Chau et al. |
| 4,881,083 A | 11/1989 | Chau et al. |
| 5,089,779 A | 2/1992 | Rorden |
| 5,337,002 A | 8/1994 | Mercer |
| 5,633,589 A | 5/1997 | Mercer |
| 5,904,210 A | 5/1999 | Stump et al. |
| 6,005,532 A | 12/1999 | Ng |
| 6,035,951 A | 3/2000 | Mercer et al. |
| 6,107,801 A | 8/2000 | Hopwood et al. |
| 6,160,401 A | 12/2000 | Mercer |
| 6,232,780 B1 | 5/2001 | Mercer |
| 6,285,190 B1 | 9/2001 | Brune et al. |
| 6,308,787 B1 | 10/2001 | Alft |
| 6,417,666 B1 | 7/2002 | Mercer |
| 6,496,008 B1 | 12/2002 | Brune et al. |
| 6,653,837 B2 | 11/2003 | Brune et al. |
| 6,756,783 B2 | 6/2004 | Brune et al. |
| 6,768,307 B2 | 7/2004 | Brune et al. |
| 6,963,201 B2 | 11/2005 | Brune et al. |
| 7,176,690 B2 | 2/2007 | Brune et al. |
| 7,304,479 B2 | 12/2007 | Brune et al. |
| 7,663,371 B2 | 2/2010 | Brune et al. |
| 7,768,265 B2 | 8/2010 | Brune et al. |
| 7,956,614 B2 | 6/2011 | Brune et al. |
| 8,680,864 B2 | 3/2014 | Brune et al. |
| 9,291,738 B2 | 3/2016 | Brune et al. |
| 9,519,074 B2 | 12/2016 | Brune et al. |
| 2002/0105331 A1 | 8/2002 | Brune et al. |
| 2016/0178783 A1 | 6/2016 | Brune et al. |

OTHER PUBLICATIONS

John E. Mercer, History of Walkover Locating Technology, Sep. 23, 1997, International Construction & Utility Equipment Expo, Louisville, Kentucky.

McLaughlin, Preliminary Manual Spot D Tek & Mole Map IV, Feb. 7, 2000, McLaughlin Product Manual.

Ridge Tool Company's Answer, Affirmative Defenses and Counterclaims to Plaintiffs' First Amended Complaint for Patent Infringement, Case No. CV 03-2297 Z, *Digital Control Incorporated* vs. *Ridge Tool Company*.

FIG. 12 ated by the '589 patent) which is
FLUX PLANE LOCATING IN AN UNDERGROUND DRILLING SYSTEM

RELATED APPLICATIONS

This is a continuation application of prior application Ser. No. 15/352,363 filed on Nov. 15, 2016; which is a continuation application of application Ser. No. 15/056,178 filed on Feb. 29, 2016 and issued on Dec. 13, 2016 as U.S. Pat. No. 9,519,074; which is a continuation application of application Ser. No. 14/174,176 filed on Feb. 6, 2014 and issued on Mar. 22, 2016 as U.S. Pat. No. 9,291,738; which is a continuation application of application Ser. No. 13/095,729 filed on Apr. 27, 2011 and issued on Mar. 25, 2014 as U.S. Pat. No. 8,680,864; which is a continuation application of application Ser. No. 12/822,537 filed on Jun. 24, 2010 and issued on Jun. 7, 2011 as U.S. Pat. No. 7,956,614; which is a continuation application of application Ser. No. 12/646,243 filed on Dec. 23, 2009 and issued on Aug. 3, 2010 as U.S. Pat. No. 7,768,265; which is a divisional application of application Ser. No. 11/924,508 filed on Oct. 25, 2007 and issued on Feb. 16, 2010 as U.S. Pat. No. 7,663,371; which is a divisional application of application Ser. No. 11/619,851 filed on Jan. 4, 2007 and issued on Dec. 4, 2007 as U.S. Pat. No. 7,304,479; which is a continuation of application Ser. No. 11/165,888 filed on Jun. 24, 2005 and issued on Feb. 13, 2007 as U.S. Pat. No. 7,176,690; which is a continuation of application Ser. No. 10/828,391 filed on Apr. 19, 2004 and issued on Nov. 8, 2005 as U.S. Pat. No. 6,963,201; which is a continuation of application Ser. No. 10/393,845 filed on Mar. 21, 2003 and issued on Jul. 27, 2004 as U.S. Pat. No. 6,768,307; which is a continuation of application Ser. No. 10/285,139 filed on Oct. 30, 2002 and issued on Nov. 25, 2003 as U.S. Pat. No. 6,653,837; which is a continuation of application Ser. No. 09/641,006 filed on Aug. 17, 2000 and issued on Dec. 17, 2002 as U.S. Pat. No. 6,496,008; the disclosures of which are incorporated herein by reference.

BACKGROUND OF THE INVENTION

The present invention relates generally to a system including an arrangement for tracking the position of a boring tool and/or one or more buried lines within a region and, more particularly, to an arrangement for using certain characteristics of a dipole locating signal emanated from the boring tool and/or certain characteristics of a locating signal emanated from the buried lines to provide indications as to the locations of the boring tool and/or the in-ground lines.

The installation of utility lines underground using horizontal directional drilling equipment is increasingly popular for reasons including elimination of the need to dig a trench. A number of prior art approaches are available for the purpose of tracking the position of the boring tool within a region using a dipole locating signal that is transmitted from the boring tool. As one example, see U.S. Pat. No. 5,633,589 entitled DEVICE AND METHOD FOR LOCATING AN INGROUND OBJECT AND HOUSING FORMING PART OF SAID DEVICE (hereinafter the '589 patent) which is commonly assigned with the present application and which is incorporated herein by reference. The '589 patent, like other prior art approaches, utilizes a portable locating device to detect the locating signal for use in providing positional indications to an operator.

While the '589 patent holds a position representing a significant advance in the field of boring tool locating and is, in fact, highly accurate and effective, it is submitted that there is room for additional improvement. In particular, at least a minimum degree of skill is required on behalf of an operator to obtain locating results that are precise within some degree of tolerance. This skill requires, for example, some advance awareness and/or training regarding particular characteristics of the locating signal itself. In this connection, at least some investment in operator training is required. Moreover, locating operations are slowed to some extent by requiring the application of procedures which insure accurate locating. These procedures become more important in proportion to the level of inexperience of an unskilled operator.

As one concern, it should be appreciated that in many regions buried lines have previously been installed. When such lines are present, it is important to avoid damage caused by contact with the boring tool. In the past, operators often relied on pre-existing information as to the location of the lines provided, for example, by a utility company or by locating services frequently provided by the utility company using simplistic locating devices and techniques. This concern has been further elevated with the possibility of the presence of fiber optic cables. In many instances, the lines are themselves electrically conductive or, in the case of fiber optic cables, are configured with an electrically conductive tracer wire for use in transmitting a utility locating signal therefrom. It is submitted that a portable unit remains to be seen which facilitates boring tool and cable locating in a single, convenient device.

The present invention provides a highly advantageous portable locator and associated method which is submitted to resolve the foregoing concerns while providing still further advantages.

SUMMARY OF THE INVENTION

As will be described in more detail hereinafter, there is disclosed herein a portable locator and associated method for tracking the position of a boring tool and/or one or more buried lines within a region.

In one aspect of the invention, the boring tool is moved through the ground within a given region along a path while transmitting a locating signal such that the locating signal exhibits locate points at the surface of the ground, both ahead of and to the rear of the boring tool. A local flux intensity of the locating signal is measured for at least one above ground point to establish a flux vector at that point which is generally oriented in a horizontal plane. The orientation of the horizontal flux vector within the horizontal plane is used in a predetermined way which, at least to an approximation, limits the possible directions of a nearest one of the locate points relative to the above ground point.

In one feature, the orientation of the flux vector is used in the predetermined way by displaying the orientation to an operator at the above ground point to at least serve as an intermediate step in guiding the operator to the locate point.

In another feature, the orientation of the horizontal flux vector indicates two possible directions of the nearest locate point that are opposing with respect to the above ground point. The horizontal flux vector is used in the predetermined way in combination with a vertical flux intensity of the locating signal that is established at the above ground point from the measured local flux intensity to indicate a single one of the two possible directions as the general direction of the nearest locate point.

In still another feature, with the portable locator in a particular orientation, a positional relationship is displayed on the portable locator including the predicted location of the nearest locate point relative to the portable locator having a directional indication such that the displayed directional indication points in the actual direction of the predicted locate point from the initial above ground point.

In yet another feature, when the orientation of the portable locator at the first above ground point is varied from the particular orientation, the portable locator displays an updated positional relationship such that the directional indication continuously points to the predicted location, irrespective of a predetermined degree of variation of orientation of the portable locator.

In an additional feature, the portable locator is moved iteratively to additional above ground points at which the display is updated so as to indicate additional directional indications. With sufficient iterations, the location of the predicted locate point converges with the actual locate point.

In another aspect of the present invention, a local flux intensity of the locating signal is measured for at least one above ground point to establish a flux vector at that point which is generally oriented in a horizontal plane. An orientation of the flux vector is then displayed to an operator at the above ground point to, at least in part, serve in guiding the operator to at least one of the locate points.

In yet another aspect of the present invention, a boring tool is moved through the ground within a given region along a path while transmitting a locating signal having a transmit axis such that the locating signal exhibits locate points at the surface of the ground, one of the locate points being ahead of the boring tool and the other one of the locate points being to the rear of the boring tool so as define a vertical plane including the transmit axis along with a locate line that is accessible at the surface of the ground and included in a locate plane which extends through the boring tool in a direction normal to the transmit axis. An above ground point is established that is within a side locating region defined between a pair of planes one of which extends through each locate point normal to the transmit axis. A local flux intensity of the locating signal is measured at the above ground point using a portable locator in a particular orientation. Using the local flux intensity, a predicted locate line angular orientation is established which, at least to an approximation, limits the possible directions to and orientations of a predicted locate line relative to the particular orientation of the portable locator at the above ground point.

In one feature, the predicted locate line may be in two possible general, but opposing directions from the above ground point. The predicted locate line angular orientation is used in combination with a vertical flux plane slope of the locating signal, that is established at the above ground point from the measured local flux intensity, to indicate a single one of the two possible general directions as the direction of the predicted locate line.

In another feature, the portable locator is moved iteratively to additional above ground points at which the display is updated so as to indicate additional positions of the predicted locate line. With sufficient iterations, the location of the predicted locate line converges with the actual location of the locate line. In yet another feature, crossing of the locate line is detected based on monitoring a vertical component of flux intensity of the locating signal.

In still another aspect of the present invention, a first type of positional relationship is displayed to an operator at an above ground point including at least the position of the portable locator and an estimated position of one of a nearest one of the locate points to, at least in part, serve in guiding the operator to at least the nearest locate point using measured values of flux intensity of the locating signal. After finding at least the nearest locate point, the locator is moved in a direction from the nearest locate point into an adjacent side locating region defined between a pair of planes one of which extends through each locate point and each of which is normal to the transmit axis. Based on a set of certain criteria within the adjacent side locating region, as the portable locator is moved therethrough, the portable locator is switched to a locate line display to display a second type of positional relationship including at least the position of the portable locator and an estimated position of the locate line. In one feature, the locate line display is automatically presented based on detection of flux lines produced by the locating signal in a predetermined range of flux slope orientation such that the portable locator is, at least to an approximation, in proximity to the locate line. The predetermined range of flux slope orientation may be determined, at least in part, using a vertical component of the intensity of the locating field.

In an additional aspect of the present invention, a region includes at least one generally straight in-ground cable line extending across the region, from which cable line a locating signal is transmitted. The cable line is located by measuring a local flux intensity of the locating signal at a first above ground point within the region using a portable locator in a particular orientation. Using the local flux intensity, a cable line angular orientation is established which limits the possible directions to the cable line relative to the particular orientation of the portable locator at the above ground point.

In one feature, a vertical flux slope orientation is established at the above ground point and an actual direction of the cable line is selected from the possible directions based on the vertical flux orientation. The cable line is then displayed in a position relative to the portable locator with the portable locator in its particular orientation.

In another feature, an updated positional relationship is displayed on the portable locator after moving the portable locator into a new particular orientation to continuously indicate, at least to within an approximation, the actual position of the cable line, irrespective of a predetermined degree of variation in orientation of the portable locator.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
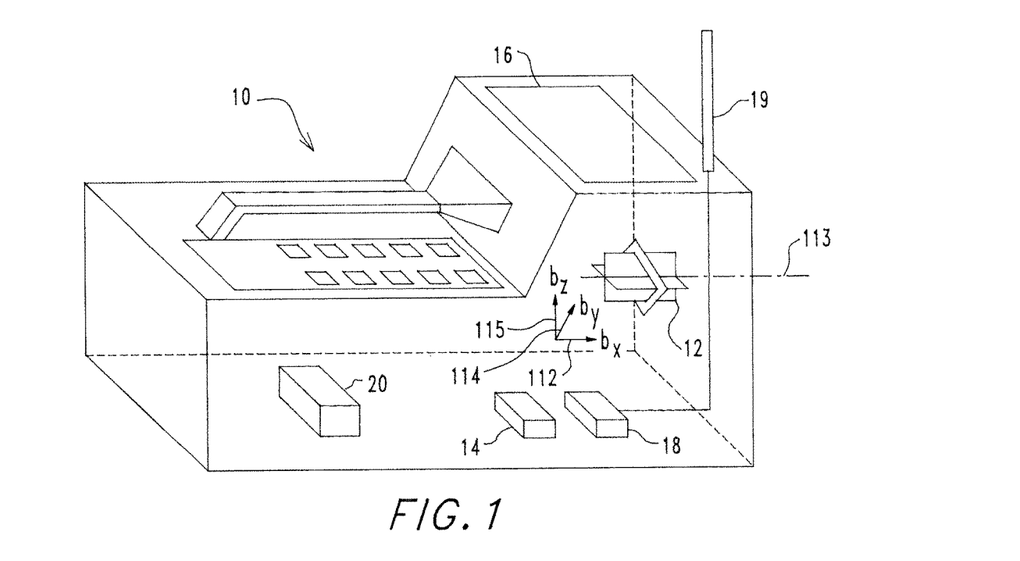
FIG. 1 is a diagrammatic perspective see-through view of a portable locator that is manufactured in accordance with the present invention and shown here to illustrate its internal components.

Turning now to the drawings, wherein like items are indicated by like reference numbers throughout the various figures, attention is immediately directed to FIG. 1, which illustrates one embodiment of a portable locator, generally indicated by the reference number 10 and assembled in accordance with the present invention. Locator 10 includes a three-axis antenna cluster 12 measuring three orthogonally arranged components of magnetic flux in locator fixed coordinates. One useful antenna cluster contemplated for use herein is disclosed by U.S. Pat. No. 6,005,532 entitled ORTHOGONAL ANTENNA ARRANGEMENT AND METHOD which is co-assigned with the present application and is incorporated herein by reference. A tilt sensor arrangement 14 is provided for measuring gravitational angles from which the components of flux in a level coordinate system may be determined. Locator 10 further includes a graphics display 16, a telemetry arrangement 18 having an antenna 19 and a microprocessor 20 interconnected appropriately with the various components. Other components (not shown) may be added as desired such as, for example, a magnetometer to aid in position determination relative to the drill direction and ultrasonic transducers for measuring the height of the locator above the surface of the ground.

Figure 2:
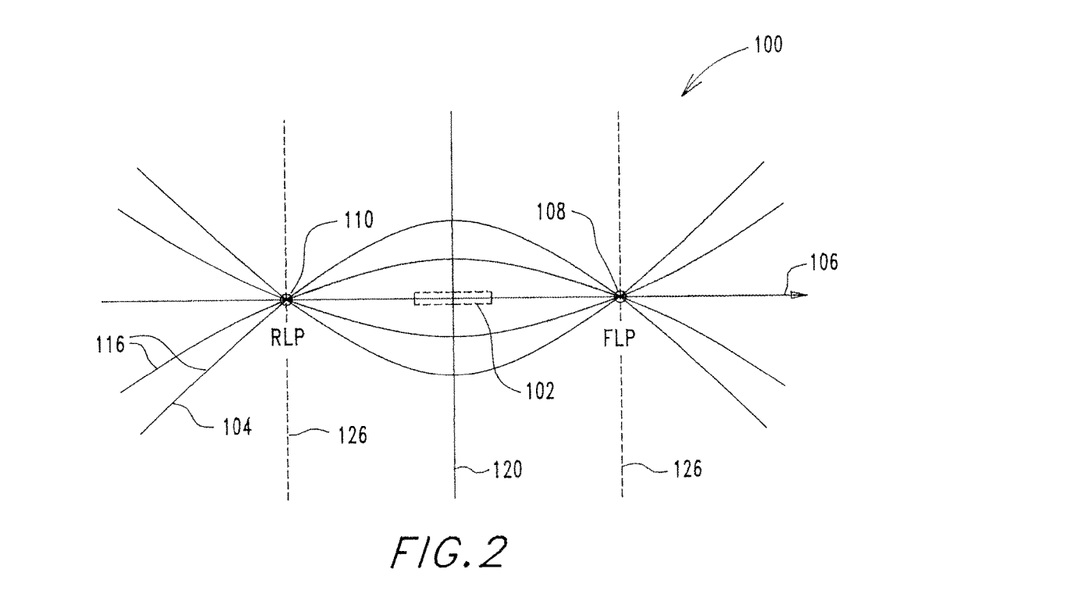
FIG. 2 is a diagrammatic plan view of a region including an in-ground boring tool, shown here to illustrate the highly advantageous characteristics and use of horizontal flux lines which pass through front and rear locate points.

Referring to FIG. 2 in conjunction with FIG. 1, a region 100 is shown including a boring tool 102 (indicated using a dashed line) which transmits a dipole locating field 104 that is received by antenna cluster 12. Region 100 is shown in plan view. It is assumed that the surface of the region is level and the boring tool is horizontally oriented. These assumptions are made only for purposes of simplifying the present discussion and do not impose restrictions or limitations on the applicability of the present invention in the absence of the assumptions. It is further assumed that boring tool 102 is oriented such that an arrowhead 106 points in a forward direction. Accordingly, a forward locate point 108 and a rear locate point 110 are present at or near the surface of the region, as described, for example, in U.S. Pat. No. 5,337,002 entitled LOCATOR DEVICE FOR CONTINUOUSLY LOCATING A DIPOLE MAGNETIC FIELD TRANSMITTER AND ITS METHOD OF OPERATION which is co-assigned with the present application and is incorporated herein by reference.

Referring to FIGS. 1 and 2, using orthogonal antenna arrangement 12, two components of the locating signal are established in a horizontal plane, for example, along an x axis 112 oriented in a longitudinal direction along the locator's axis of symmetry 113 for measuring a $b_x$ component of locating field intensity and along a y axis 114 for measuring a $b_y$ component of locating field intensity. A third component $b_z$ is measured along a vertical, z axis 115. A series of flux lines 116 indicate the directional orientation of these flux lines which are made up of only components of the locating signal intensity within the horizontal x-y plane of the figure. It is noted that all flux lines in the horizontal plane (FIG. 2) pass through the locate points. This latter characteristic of the locating field is an important recognition, in accordance with the present invention, which is relied on by locator 10, as will be further described. The x and y flux components needed to produce FIG. 2 may readily be determined using locator 10, for example, by insuring that the locator is level and oriented in a particular direction or by measuring all components using antenna cluster 12 in a particular orientation (i.e., an $x_{ant}$, a $y_{ant}$ and a $z_{ant}$ component that is orthogonal to the $x_{ant}$-$y_{ant}$ plane) and determining the $b_x$ and $b_y$ components with reference to tilt and magnetic sensors.

Figure 3:
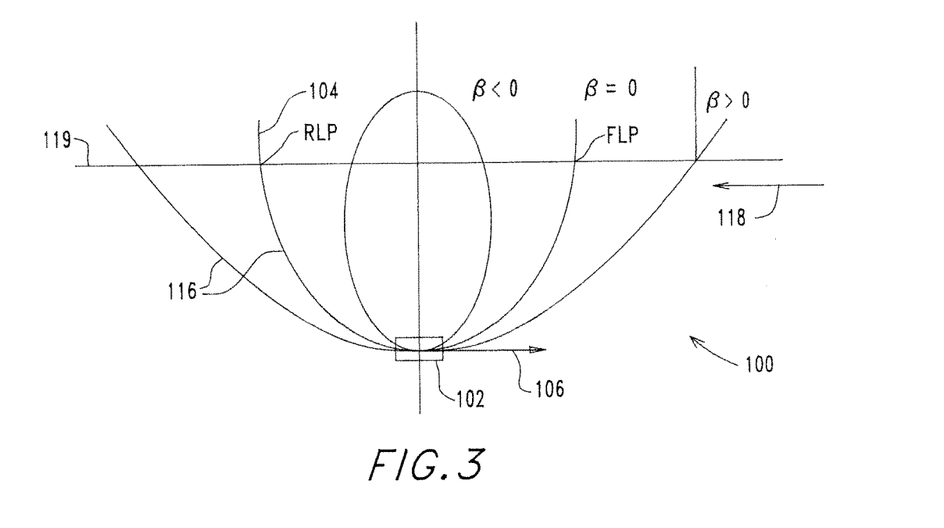
FIG. 3 is a diagrammatic elevational view of the region of FIG. 2 showing the boring tool along with flux lines that are oriented in a vertical plane along a transmit axis of the boring tool.

Turning to FIG. 3 in conjunction with FIG. 2, the flux pattern in a vertical plane along drilling direction 106 is shown by FIG. 3 along with a locating direction 118 indicated by an arrow. At a locate point, the horizontal components of flux are zero such that the entire magnetic flux is vertical. The flux lines in a vertical plane change slope at the locate points as the locate point is passed. The boring tool is found between the locate points. When the transmitter and the ground surface are both level (zero pitch, as illustrated), the boring tool is half way in between the locate points on a level ground surface 119. The horizontal distances between locate points and the over-the-transmitter position, directly above the boring tool, become unequal when the transmitter is pitched. Another feature of the dipole magnetic field is a locate line 120 (FIG. 2) at which the magnetic flux lines in all planes containing the transmitter axis are parallel to the transmitter axis. Note that the locate line is also in a plane perpendicular to the axis of the transmitter and, therefore, changes its position relative to the ground surface with changes in transmitter pitch.

Figure 4:
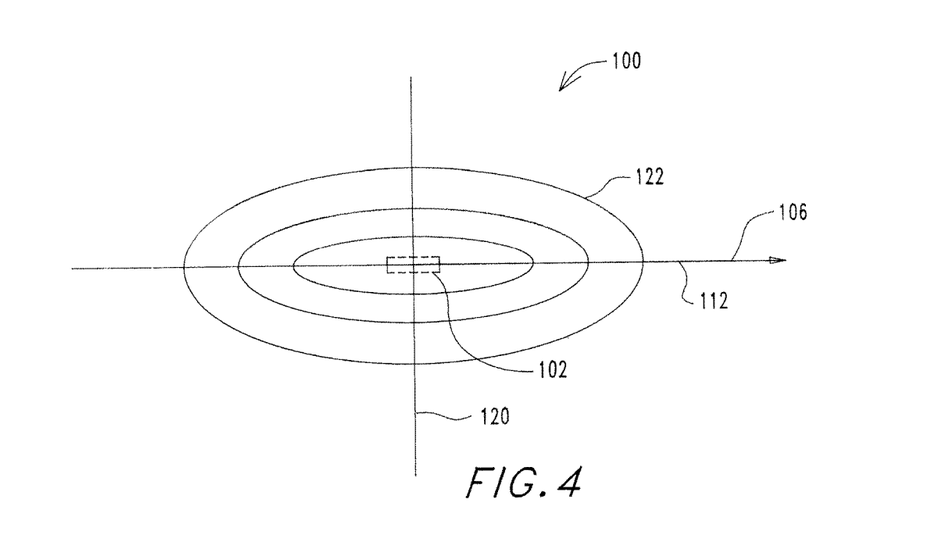
FIG. 4 is diagrammatic plan view illustrating the region of FIG. 1 including contours of equal total magnetic flux intensity in a horizontal plane, shown here to illustrate the close relative spacing of the contour lines along a locate line.

Still considering locate line 120, attention is directed to FIG. 4 which illustrates region 100 including the total magnetic flux intensity (total signal strength) in a horizontal plane at or above the boring tool, again assuming that the boring tool is at zero pitch. A series of contours 122 of total signal strength at different fixed levels of signal strength are shown. The contours vary in magnitude of signal strength by an equivalent amount from one contour to the next. It should be noted that the contours are farther apart along a path in the drilling direction as compared to their separation along locate line 120, normal to the boring tool transmitter axis and drilling direction. Accordingly, it is recognized that the rate of change in signal strength with movement at the surface of the ground is greatest along the locate line. In this regard, it should be appreciated that the use of the locate line is considered as being advantageous in light of this recognition, for example, in the side locating technique described below.

Figure 5:
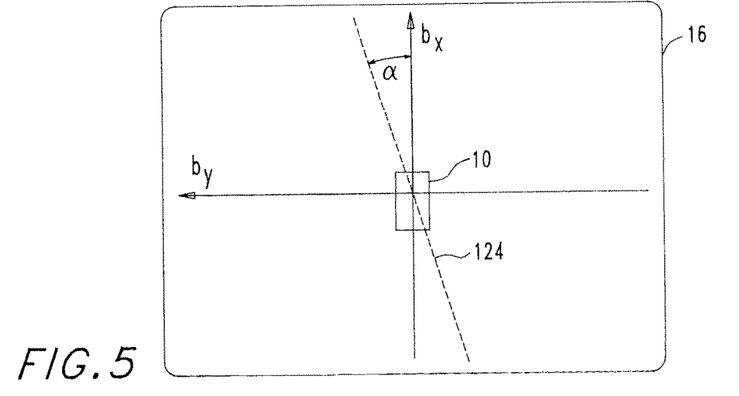
FIG. 5 is a diagrammatic view of the display of the portable locator of FIG. 1, showing a horizontal flux vector based on the flux lines seen in FIG. 2 for use in tracking the boring tool using the highly advantageous flux plane technique of the present invention.

Referring to FIGS. 1, 2 and 5, the directional orientation of horizontal flux lines 116 relative to locator 10 is determined using $b_x$ and $b_y$ measured with respect to the axis of symmetry of the portable locator. FIG. 5 illustrates display 16 showing region 100 with locator 10 at the origins of measured $b_x$ and $b_y$ intensity vectors. Accordingly, the tangent of an orientation angle $\alpha$ is defined as:

$$\tan \alpha = b_y/b_x \quad (1)$$

Therefore, with locator 10 at rest relative to the surface of the ground, equation 1 can be used to display the orientation of a local horizontal flux line 124 on display 16 of the locator. It should be understood that the locator's received flux line (FIG. 5) rotates when the locator is rotated about its vertical axis. As long as the transmitter is at rest, however, the flux line does not move with respect to the ground surface.

Still referring to FIGS. 1, 2 and 5, in and by itself, the use and/or display of local horizontal flux line 124 is considered to be highly advantageous. For example, displaying local horizontal flux line 124 of FIG. 5 serves to limit the possible directions of the nearest locate point relative to the position of the locator. In this regard, it should be appreciated that local horizontal flux line 124 of FIG. 5 represents the tangent to one of horizontal flux lines 116 shown in FIG. 2. For any position of the locator within region 100, the local horizontal flux vector or flux line may be considered to point to a predicted location of the locate point. Depending upon the position of the locator in the region, the predicted location represents the actual location of the locate point only to an approximation. These considerations are readily observed by noting the shape of the horizontal flux lines in FIG. 2 and by bearing in mind that the locator determines the tangent at any position along one of flux lines 116. The closer the locator is to the locate point, the more accurately the tangent of the horizontal flux line points to the locate point. Upon actually finding a locate point, the horizontal flux components $b_x$ and $b_y$ go to zero (i.e., only the $b_z$ component is non-zero at the locate point) and directional indications are no longer defined.

Referring to FIGS. 2 and 5, using only the described feature of observing the local horizontal flux vector or flux line, identifying the position of a locate point is relatively simple. That is, since x axis 112 (FIG. 4) represents the axis of symmetry of the locator, the operator of the locator may follow one of flux lines 116 by simply rotating the locator until $\alpha$ is zero. That is, x axis 112 is aligned with local horizontal flux vector 124. By maintaining this alignment, as at least an intermediate step, while continuously moving the locator in the predicted direction of the locate point, the locator can follow one or more of the flux lines directly to a locate point. In this regard, it has been found that there is no requirement to follow a single one of the flux lines since the direction of a predicted location of the locate point is always indicated irrespective of being on any particular flux line. This technique is particularly effective when the locator is in the region between the locate points, as defined by a pair of side locating planes 126 that are oriented such that one plane passes through each locate point and each is normal to the transmit axis of the boring tool.

Having generally described the flux plane locating feature of the present invention, attention is now directed to certain additional features which further enhance its use. It should be appreciated that observing local horizontal flux vector 124 provides no information as to which direction along the flux vector is the correct direction to proceed in order to arrive at a locate point. That is, the flux vector, by itself, is ambiguous as to the actual direction of the nearest locate point along its directional orientation. In fact, if one were to follow the local flux vector initially away from the locate point outside of side locating planes 126, one would never arrive at a locate point. As discussed above, the technique will always bring one to a locate point if one begins within the region between side locating planes 126. However, the locate point farthest from the initial position may be the one that is found first in the absence of additional provisions. While a number of techniques may be used to indicate the direction in which to proceed along the local flux vector towards a nearest one of the locate points, one highly advantageous technique utilizes the vertical component of intensity of the locating signal. More particularly, the vertical flux slope, as will be described immediately hereinafter.

Referring to FIG. 3, the slope of a flux line in a vertical plane can be defined as:

$$\tan \beta = -\mathrm{sign}\!\left(\frac{b_x}{b_z}\right)\sqrt{\left(\frac{b_x}{b_z}\right)^2 + \left(\frac{b_y}{b_z}\right)^2}. \quad (2)$$

Here, the vertical plane is assumed to be along the tangent of the horizontal flux line at any particular location in region 100. The sign of angle $\beta$ depends on locating direction and on locator position relative to the locate points (and locate line). As an example, $\beta$ becomes positive when the user is ahead of the forward locate point, pointing the locator in the direction of the boring tool transmitter (i.e., facing the boring tool transmitter in locating direction 118). As described above, the true direction from locator to locate point cannot be determined based on the measurement of the flux vector at one point of the magnetic locating field. Since all horizontal flux lines go through the locate points, however, one can just follow a flux line to ultimately find a locate point, accepting the attendant 180 degree ambiguity. The use of β, however, serves to resolve this concern. Similarly, the true distance to a locate point can also not be determined based on available data obtained at a single point, but the angle β can serve as a practical indication of the distance to the locate point. By combining the described elements including the use of the local horizontal flux vector and the use of β, a highly advantageous and heretofore unseen technique is provided.

By using the technique described immediately above, the operator can progressively move toward the locate point. After moving to a new above ground point in the direction of a new predicted location of the locate point along the direction defined by the horizontal flux vector at the current location of the portable locator, a new local flux intensity is measured at the new above ground point. At the new above ground location, the locator then indicates a new direction based on the local horizontal flux vector. Once again, the operator moves in accordance with the indications. Ultimately, the operator will arrive at the locate point after repeating this process a sufficient number of times, as the predicted location of the locate point converges on its actual position. At each progressive location, the use of the vertical flux slope is used to provide the indication as to which of the two directions of the local flux vector is toward the locate point. If the operator passes the locate point, the locator will indicate that movement in the opposing direction along the local flux vector is necessary.

With each successive measurement, the locator displays a positional relationship including the predicted location of the nearest locate point relative to the locator, with a directional indication, such that the directional indication points in the actual direction of the predicted location of the locate point from an initial or subsequent above ground point. Moreover, it should be appreciated that if the locator is held at one above ground point in varying orientations, the locator will display an updated positional relationship which accounts for variation in the orientation so as provide a directional indication which continuously points in the actual direction of the predicted location of the locate point, irrespective of a predetermined degree of variation in the orientation. That is, within an approximation, depending upon the frequency with which the display is updated. Using a state of the art microprocessor, an update rate of approximately 15 positions per second is readily achieved in locate point indication as well as in other tracking implementations to be described. Thus, the positional relationship is continuous insofar as the perceptions of the operator of the portable locator are implicated, accounting for position and/or orientation changes experienced by the locator. As will be further discussed, this locating technique has been found to be remarkably effective in the hands of an operator with virtually no experience due to the intuitive nature of the display provided by the locator. Specific displays utilizing the foregoing concepts will be provided immediately hereinafter.

Figure 5A:
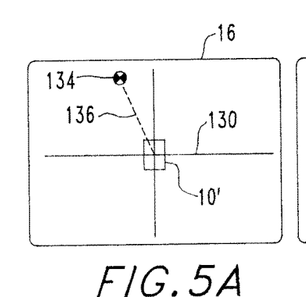
FIG. 5A is a diagrammatic view of the display of the portable locator of FIG. 1, showing the location of a predicted locate point ahead of the current position of the portable locator illustrating the highly advantageous and intuitive use of the flux plane locating technique of the present invention.

Turning to FIG. 5A, display 16 is illustrated including a set of crosshairs 130 at the intersection of which the locator of the present invention is positioned, as indicated by a virtual locator box 10'. The vertically oriented crosshair is oriented along the axis of symmetry of the locator. Hence, the upward direction in the figure represents dead ahead to the operator of the portable locator. In essence, this display presents a "picture" of the operational region to the operator which shows his location at the center relative to a predicted direction and distance of a locate point. The predicted location of a nearest locate point is indicated by a target symbol 134. The latter may be connected to the crosshair intersection by a line 136 (representing the local flux line) for purposes of emphasizing the predicted direction of the locate point. The display of FIG. 5A is provided when β>0. In this instance, the locate point will be ahead of the locator, above the horizontal crosshair, with its predicted direction indicated by the local horizontal flux vector (i.e., the tangent to the local horizontal flux line given by equation 1). The distance to the predicted location of the locate point is proportional to |β|. That is, β is zero at the locate point and increases with increasing distance from the locate point.

Figure 5B:
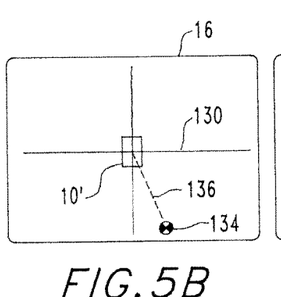
FIG. 5B is a diagrammatic view of the display of the portable locator of FIG. 1, showing the location of the predicted locate point of FIG. 5A behind the current position of the portable locator further illustrating the highly advantageous and intuitive use of the flux plane locating technique of the present invention.

Referring to FIG. 5B, display 16 is illustrated with the predicted location of the locate point behind the portable locator. In this instance, β<0 such that locate point target symbol 134 is shown in the lower part of the display below the horizontal crosshair. Similarly, distance is based upon the magnitude of β.

Figure 5C:
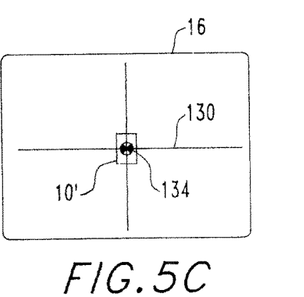
FIG. 5C is a diagrammatic view of the display of the portable locator of FIG. 1, showing the location of the predicted locate point of FIG. 5A at the current position of the portable locator such that the predicted and actual positions of the locate point have merged upon having found the locate point through the operator having intuitively moved the locate point to the crosshair intersection.

Referring to FIG. 5C, display 16 is illustrated in the instance in which the locate point has been reached. Thus, β is equal to zero and target symbol 134 is moved to the center of crosshairs 130. As mentioned, in applying this locating procedure, the operator need not follow the same flux line to the locate point. Instead, the operator may switch over to any convenient flux line which allows moving the locate point target symbol to the center of the display crosshairs. Finding a locate point is as simple as putting a "ball in the box". In actual testing, the disclosed technique has proven to be remarkably simple and effective. Moreover, the technique has proven to be so intuitive that locator 10 has been handed to a person with no knowledge or training in locating techniques and that person has used locator 10 to proceed forthwith directly to a locate point.

Figure 6:
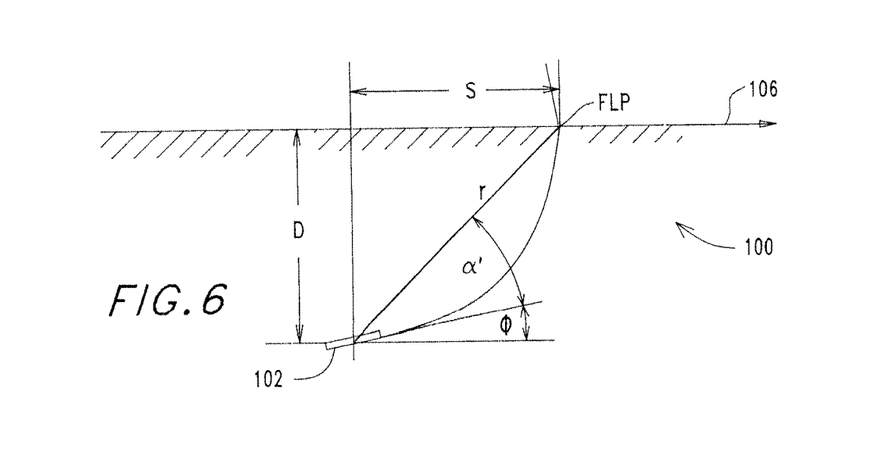
FIG. 6 is a diagrammatic elevational view of the boring tool in the locating region after having found the forward locate point shown here for use in illustrating the determination of distance and depth values from the locate point.

Referring to FIG. 6, boring tool 102 is shown pitched in region 100. Having reached a locate point, a projected transmitter depth D and a horizontal distance s at the surface of the ground from the locate point to an overhead point, OH, directly above the boring tool transmitter are obtained from measured flux and transmitter pitch using the following equations:

$$D = r \sin(\alpha' + \phi) \quad (3)$$

$$s = r \cos(\alpha' + \phi) \quad (4)$$

where r is a radial distance between the boring tool transmitter and the locate point, φ is the boring tool transmitter pitch, and α' is the angle formed between the axis of symmetry of the boring tool transmitter and radius r. where $$r^3 = \frac{4}{-b\sin\phi + b\sqrt{8 + \sin^2\phi}} \quad (5)$$

$$\tan\alpha' = \frac{4}{3\tan\phi + \sqrt{8 + 9\tan^2\phi}}. \quad (6)$$

It is noted that b denotes the total locating signal strength at a locate point. When using these equations, if transmitter pitch is not zero, it is necessary to distinguish between the forward and rear locate point. For use at the forward locate point, the equations are used as written. For the rear locate point, however, the sign of transmitter pitch φ must be reversed. Pitch is generally measured by a sensor in the boring tool transmitter with the pitch data being modulated on the dipole locating signal. It is also worth mentioning that useful determinations can be performed when the horizontal distance from a locate point to the over-the-transmitter position is known, for example, in determining or double checking depth, D. A precise overhead location can be determined in one way by monitoring total signal strength, which reaches a maximum above the boring tool transmitter.

Referring again to FIG. 2, it should be appreciated that there are situations in which locate points cannot be reached. In these situations, the boring tool must be found in an alternative way. In other situations, the operator my find a locate point, but is still unable to walk to a position above the boring tool transmitter. Perhaps the boring tool is beneath a river or some sort of structure. In any of these situations, locate line 120 may provide valuable guidance since it is possible that the operator will have access to at least some portion of the locate line.

Figure 7:
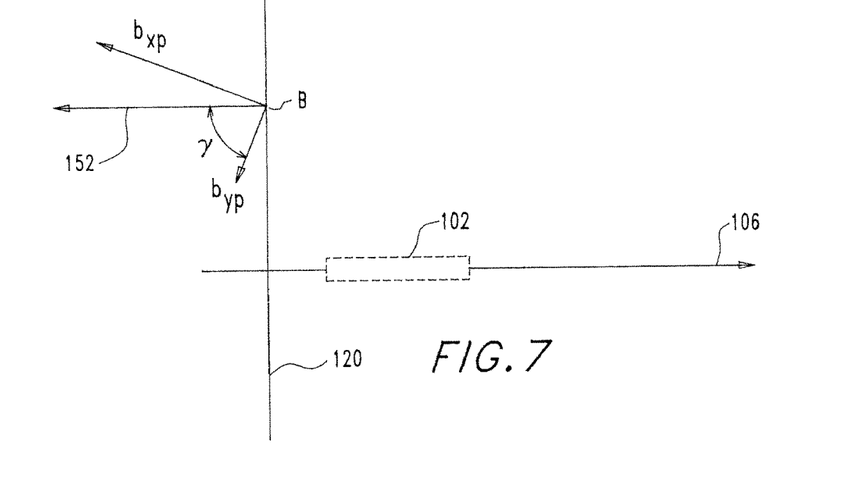
FIG. 7 is a diagrammatic plan view of the boring tool in the locating region shown here to illustrate side locating using a locate line which is shifted away from a position directly above the boring tool at the surface of the ground when the boring tool is pitched.
Figure 8:
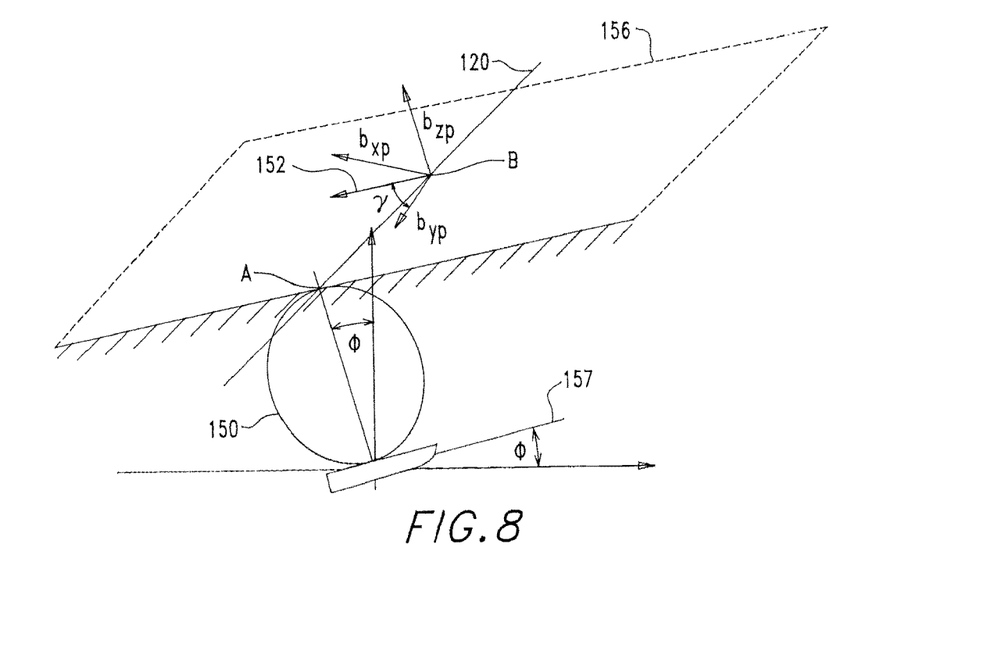
FIG. 8 is a diagrammatic view, in elevation, showing the boring tool of FIG. 7 and further illustrating, in perspective, a pitch plane that is parallel to the transmit axis of the boring tool and which contains the locate line, illustrating further details with regard to side locating using the locate line.

Referring to FIGS. 7 and 8, characteristics of the locating signal with regard to the locate line will now be described. FIG. 7 is a plan view showing boring tool 102 in region 100. FIG. 8 is an elevational view showing boring tool 102 at a pitch φ. The surface of the ground is not shown for purposes of clarity. A flux line 150 is illustrated which passes through a point A (FIG. 8) on locate line 120. It should be observed that locate line 120 is shifted in position at the surface of the ground due to the nonzero pitch value such that the locate line does not pass directly over the boring tool. As the pitch changes, locate line 120 moves at the surface of the ground. A flux vector 152, obtained from a reading taken at point B (offset on the locate line from point A) and on a different flux line (not shown), includes an intensity and directional orientation, as indicated. The locate line is itself contained in a pitch plane 156 (FIG. 8) that is parallel to axis 157 of the boring tool transmitter. Thus, the pitch plane is normal to any plane which is itself normal to the transmit axis. It should be appreciated that, if the pitch is zero, pitch plane 156 is horizontal and parallel to a horizontal ground surface. Flux vector 152 is resolved in two orthogonal directions in the pitch plane, which directions are designated by the components $b_{x_p}$ and $b_{y_p}$. In the instance of a zero pitch value, the $b_{x_p}$ component is equal to the component $b_x$ determined along x axis 112 in FIG. 1 while the $b_{y_p}$ component is equal to the component $b_y$ determined along y axis 114. Where the pitch plane is not horizontal, the $b_{x_p}$ component is in vertical alignment with the $b_x$ component. In other words, $b_{x_p}$ projects directly onto $b_x$ within the horizontal x-y plane with the x axis being the axis of symmetry of locator 10. The $b_{x_p}$ and $b_{y_p}$ values are readily determined using pitch φ, $b_x$ and $b_y$.

A predicted locate line orientation angle γ is formed between pitch plane flux vector 152 and $b_{y_p}$. Knowing $b_{x_p}$ and $b_{y_p}$:

$$\tan \gamma = b_{y_p}/b_{x_p} \quad (7)$$

Using the predicted locate line angular orientation, γ, locate line 12 is displayable as a line normal to the flux line (at point B) in pitch plane 156 (FIG. 8), as will be seen. A measure for the distance to the locate line may be based upon flux component $b_{z_p}$, normal to the pitch plane. This distance is thus proportional to $$\frac{b_{z_p}}{\sqrt{b_{x_p}^2 + b_{y_p}^2 + b_{z_p}^2}} \quad (8)$$

While the estimated distance and directional orientation are now known, it should be appreciated that two possible, but opposing directional ranges are defined. In other words, it is unknown whether the locate line is in one general direction from the locator or in exactly the opposite direction. Vertical flux slope orientation, β, determined using equation 2 is useful in combination with the predicted locate line angular orientation in selecting which of the two opposing directions is toward the actual predicted locate line.

Further considering the use of vertical flux slope orientation in the present context, because flux $b_{z_p}$ changes sign at the locate line, this information is useful in triggering the side locating or locate line display. It should be noticed that the described features are sufficient to approach the locate line at any angle and to follow it to the transmitter or a reference point when side locating so long as the locator is between side locating planes 126 of FIG. 2. In this regard, it should be appreciated that the determined position of the locate line is a predicted location. As the locate line is approached, the actual position of the locate line converges with the prediction location since the relationship defined by equation 7 gives the correct orientation for values measured only at the locate line. Therefore, this technique is similar to that discussed above for finding a locate point. That is, the direction of the locate line with respect to the portable locator is correct within an approximation, depending upon the distance between the locate line and the locator such that viewing the orientation of the predicted locate line establishes a general direction toward the predicted locate line. The side locating technique of the present invention is also performed in an iterative manner in order to approach the actual locate line. After beginning at some initial point within the side locating region, the locator is moved toward the predicted locate line. The display will then be updated at a new above ground point to indicate a new predicted locate line in a new orientation based on new readings of the local flux intensity. The operator then proceeds in the direction of the new predicted locate line. With sufficient iterations, the positions of the actual locate line and the predicted locate line will converge. Specific displays utilizing the foregoing locate line technique will be described immediately hereinafter.

Figure 9A:
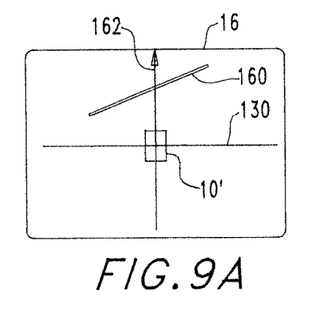
FIG. 9A is the first figure in a series which diagrammatically illustrate the appearance of the display of the locator of the present invention during side locating with the predicted locate line ahead of the locator at the intersection of the crosshairs.

Referring to FIGS. 9A-9D, a series of locate line displays is presented which diagrammatically illustrate the appearance of display 16 on locator 10 (FIG. 1). FIG. 9A illustrates the appearance of display 16 including a predicted locate line 160 at a distance from the portable locator that is estimated, for example, using equation 8. Again, the position of the portable locator in the display corresponds to the intersection of crosshairs 130. In the example of FIG. 9A, the predicted locate line is directly ahead of the portable locator vertically upward and skewed in the figure. The dead ahead direction, along the axis of symmetry of the portable locator, is emphasized by an arrowhead 162.

Figure 9B:
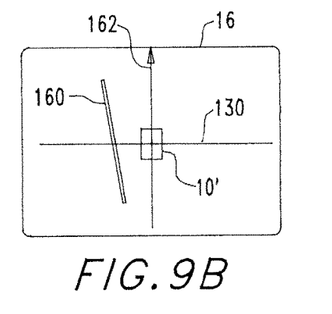
FIG. 9B is the second in the series of figures beginning with FIG. 9A which illustrates the predicted locate line to the left of the locator.

FIG. 9B illustrates the appearance of display 16 in the instance where predicted locate line 160 is generally to the left of the portable locator. The operator, in proceeding with the intent of finding the locate line, will intuitively orient the portable locator such that the predicted locate line is dead ahead. It should be appreciated that this side locating technique is highly advantageous in the manner of the flux plane technique described for locating locate points, as described above. That is, a display is presented which illustrates to the operator the actual direction in which to proceed toward the predicted location of the locate line. Moreover, the predicted location of the locate line is updated at a predetermined interval such that changes in the orientation of the portable locator (i.e., those changes that include a rotational component about a vertical axis) result in a new, updated presentation on display 16 so as to illustrate the actual direction in which the operator should proceed on a continuously updated basis irrespective of orientation and/or position changes to which the locator is subjected. Again, the display is continuous insofar as the perception of the operator is concerned.

Figure 9C:
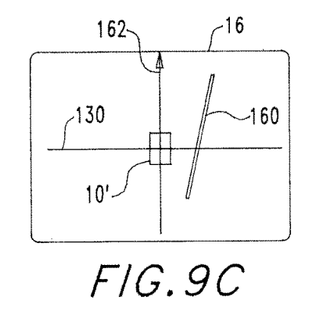
FIG. 9C is the third in the series of figures beginning with FIG. 9A which illustrates the predicted locate line to the right of the locator.

FIG. 9C illustrates display 16 with predicted locate line 160 generally to the right of the position of the portable locator. Accordingly, the operator will turn to the right, towards the predicted location, which will result in a display resembling that of FIG. 9A.

Figure 9D:
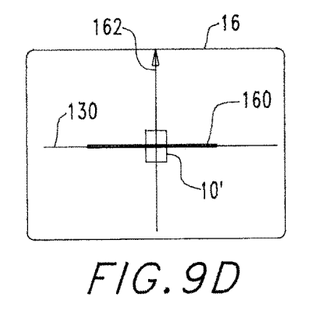
FIG. 9D is the fourth in the series of figures beginning with FIG. 9A which illustrates the predicted locate line coextensive with a horizontal one of the crosshairs such that a point along the locate line has been found while the predicted position of the locate line has merged with the actual position of the locate line.

FIG. 9D illustrates display 16 having predicted locate line 160 coinciding with the horizontal one of crosshairs 130. Having achieved this display, the position of the predicted locate line has converged on the actual location of locate line 120 (FIG. 2). Therefore, the operator has succeeded in finding a point on the locate line. Using this information, the operator may continue side locating by continuing to track the locate line, for example, as the boring tool passes beneath a structure or rock formation.

Because the aforedescribed technique for finding and displaying the locate line is useful only in the region between planes 126 which define the side locating region, a number of different methods may be utilized in order to ensure that the operator is within this region. The methods can be employed individually or in combination. Three of these methods are described immediately below.

In a first method, a locate point is first found, for example, using the flux plane technique described above. Thereafter, the operator proceeds in any direction while monitoring the signal strength of the locating signal while verifying that the signal strength is increasing. If the signal strength decreases, the operator should return to the locate point and try a new direction. By monitoring for an increase in signal strength, it is assured that the operator is moving into the side locating region defined between side locating planes 126 of FIG. 2.

In a second method, the aforedescribed angle β is used to monitor progress toward the locate line. Upon approaching the locate line, β approaches either +90 or −90 degrees. When β is within a pre-selected range, the locator is in the vicinity of the locate line at least to a first approximation. That is, the measurement error in displaying the predicted locate line is within a corresponding range. In fact, one implementation contemplates automatically presenting a locate line display when β enters this pre-selected range. Alternatively, the operator may be notified on display 16 that the locate line display is available for use. The operator may then press a button to manually actuate the locate line display mode. As another alternative, the locate line display may automatically be triggered upon detection that the locate line has been crossed. This is particularly useful in the case where the tan β expression of FIG. 2 changes signs. In this instance, the display would then show the predicted locate line behind the locator (i.e., below rather than above the horizontal one of crosshairs 130 in FIG. 9A).

In a third method, the positions of both of the locate points are established. The side locating region resides between the locate points, as described above. Having established the locate point positions, the operator may proceed with the side locating technique of the present invention at any point within the side locating region. It should be appreciated that many variations are possible in presenting a locate line display in view of the foregoing teachings. Accordingly, all of these variations are considered as falling within the scope of the present invention so long as the disclosed teachings are applied.

Having described the highly advantageous features of the present invention for establishing locate point positions and for performing side locating, it is important to understand that these features may be integrated within the same portable locator. An overall highly advantageous method is thereby implemented which permits displaying a first type of positional relationship to an operator at an above ground point including at least the position of the portable locator and an estimated position of one of the locate points. This display serves to, at least in part, guide the operator to at least the nearest locate point using measured values of flux intensity of the locating signal. After finding the nearest locate point, or both locate points, the portable locator is moved in a direction from the nearest locate point into the adjacent side locating region defined between the side locating planes, one of which extends through each locate point and each of which is normal to the transmit axis. Thereafter, as the locator is moved in the side locating region, a set of certain criteria is monitored within the side locating region for actuating purposes. When the criteria are satisfied, for example, in the aforedescribed manners including detection of readings within a predetermined range of flux slope orientation, switching to the locate line display is performed to display a second type of positional relationship including at least the position of the portable locator and an estimated position of the locate line.

While the described locating procedure and display features allow detection of the position and orientation of an underground transmitter, detection of an underground utility consisting, for example, of a power cable, a telephone line, a pipeline or any other obstacle with an imbedded active tracer wire is performed in a highly advantageous way. This type of locating is referred to hereinafter as cable line locating. In locating a boring tool, described above, the transmitter emits a dipole-type magnetic field. In contrast, the current in the tracer wire of a cable line produces a two-dimensional magnetic field, as will be further described.

Figure 10:
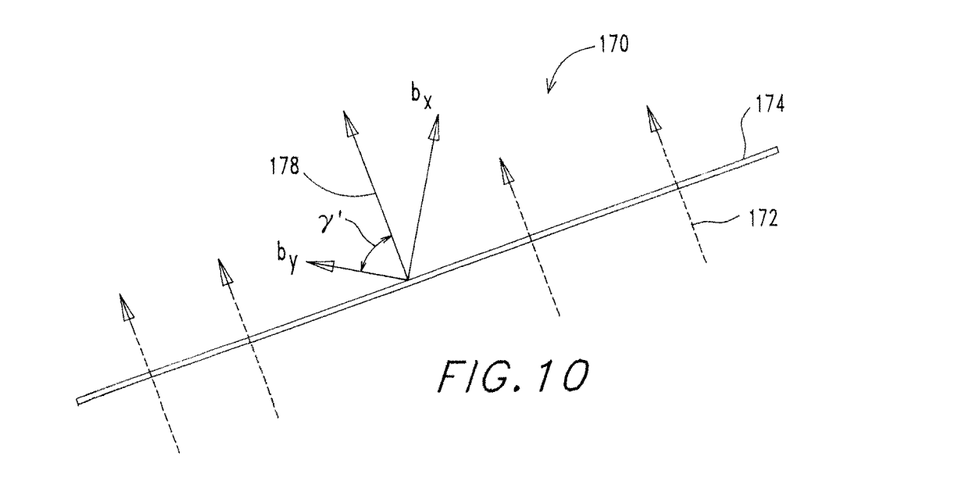
FIG. 10 is a diagrammatic plan view of a locating region including a cable line, shown here to illustrate details of a locating signal that is emitted by the cable line including the way in which the cable line locating signal resembles the characteristics of a locate line exhibited within a dipole locating field.
Figure 11:
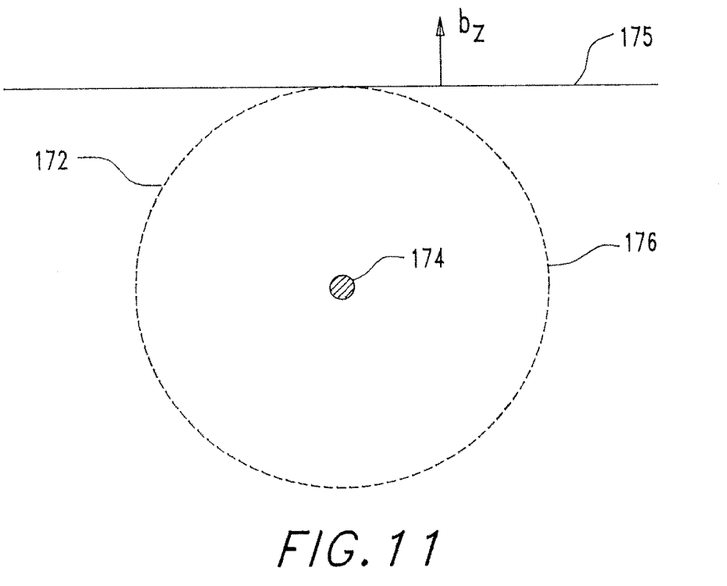
FIG. 11 is a diagrammatic elevational end view of the cable line of FIG. 10 illustrating further details of the cable line locating signal.

Referring to FIGS. 10 and 11, a region 170 is shown including a cable line locating field 172 surrounding a cable line 174 beneath a horizontal ground surface 175. It should be appreciated that cable line locating field 172 is much less complex than the magnetic dipole locating field seen in the methods and examples appearing above. For purposes of simplicity, cable line 174 is illustrated in a horizontal orientation, however, this is not a requirement.

Still referring to FIGS. 10 and 11, it is assumed that the cable line is relatively straight over a distance large compared to its depth beneath the surface of the ground. Accordingly, FIG. 11 shows that cable locating field 172 is two-dimensional, characterized by a pattern of circular flux lines 176 in planes normal to the tracer wire which pattern repeats along the cable line. The flux lines immediately above the cable line are normal to its plan-view in FIG. 10, as indicated by a flux vector 178. Further, a vertical component of flux intensity, $b_z$ (FIG. 11), changes sign at the overhead position directly above the cable line. That is, $b_z$ is zero at the overhead position, and is therefore illustrated offset from the overhead position, but has a different sign on either side of the overhead position. Clearly, these characteristics of a cable line are related to those of a locate line so that the locate line procedure, described above, is also generally applicable in cable line locating. In this regard, the cable line does not exhibit a side locating region which advantageously further simplifies the overall cable line locating procedure.

The present example also considers a horizontally oriented cable line which is typically the case. Further, the instant procedure is directly applicable without modification to a slanted cable line.

Still referring to FIGS. 10 and 11, cable line locating signal 172 is resolved into horizontal flux components $b_x$ and $b_y$. The former is once again the locate direction that is defined by the axis of symmetry of portable locator 10. In the instance in which the particular orientation of the portable locator is not horizontal, these component values are readily determined, for example, using a tilt meter reading taken within the portable locator.

A cable line orientation angle $\gamma'$ is formed between flux vector 178 and $b_y$. Knowing $b_x$ and $b_y$:

$$\tan \gamma' = b_y/b_x \qquad (9)$$

Using the cable line angular orientation, $\gamma'$, locate line 12 is displayable as a line normal to flux line 178. In this regard, it should be appreciated that the cable line angular orientation differs with respect to the aforedescribed side locating procedure in that the cable line orientation angle represents the actual directional orientation of the cable line, rather than a predicted direction. Like side locating, a 180 degree angular ambiguity is also present. A measure for the distance of the cable line may be based upon flux component $b_z$, normal to the pitch plane. This distance is thus proportional to $$\frac{b_z}{\sqrt{b_x^2 + b_y^2 + b_z^2}} \qquad (10)$$

With the estimated distance and an ambiguous directional orientation now known, the directional ambiguity is resolved using vertical flux slope orientation, $\beta$, determined using equation 2. Further, considering the use of vertical flux slope orientation in the cable line context, because flux $b_z$ changes sign at the locate line, this information is useful in indicating passing across an overhead point directly above the cable line. Like a locate line, the cable line can be approached at any angle and followed thereto. The cable locating technique of the present invention is also performed in an iterative manner in order to find the cable line. After beginning at some initial point, the locator is moved toward the indicated cable line. The display will then be updated at a new above ground point to indicate a new position of the cable line in a new orientation based on new readings of the local flux intensity. The operator then proceeds in the direction of the new cable line location. With sufficient iterations, the cable line will be found.

Specific displays utilizing the cable line locating technique of the present invention are not provided since these displays may be essentially identical to the side locating displays seen in FIGS. 9A-9D, described above. As in the case of side locating using this display form, the operator, in proceeding with the intent of finding the cable line, will intuitively orient the portable locator such that the predicted cable line is dead ahead. Moreover, the display presented illustrates to the operator the actual direction in which to proceed toward the location of the cable line. Like the side locating implementation, the displayed location of the cable line is updated at a predetermined interval such that changes in the orientation of the portable locator, including a rotational component about a vertical axis, result in a new, updated presentation on display 16 so as to illustrate the actual direction in which the operator should proceed on a continuously updated basis. As mentioned above, this display feature is operative with respect to position and/or orientation changes experienced by the locator and is, for practical purposes, continuous at the contemplated update rates.

Figure 12:
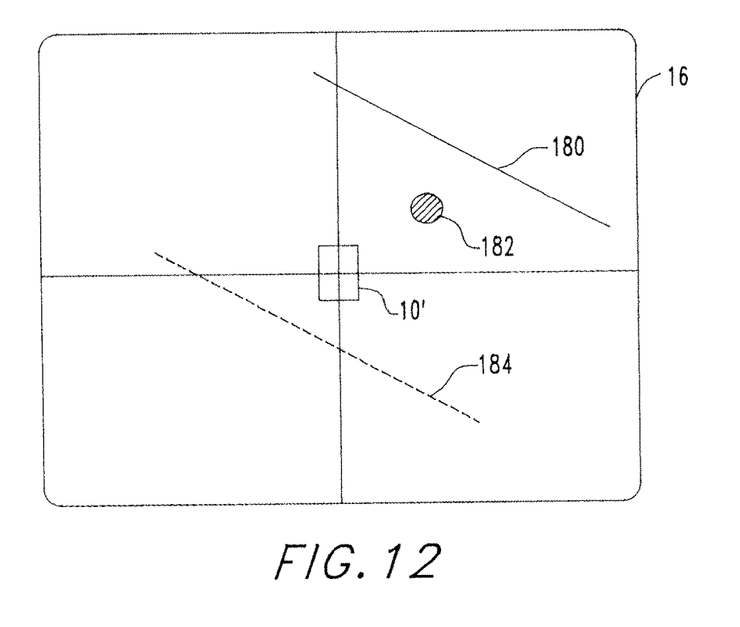
FIG. 12 is a diagrammatic view of the display of the locator of the present invention shown here to illustrate the highly advantageous simultaneous display of a cable line, a locate line and a locate point.

Turning to FIG. 12, the cable line locating feature and associated display may be used alone for cable line locating or may be integrated with the locate point and/or locate line locating features. FIG. 12 illustrates display 16 with a combination of all three forms of locating "objects" displayed. Specifically, a cable line 180 is represented by a solid line, a predicted locate point 182 is illustrated as a dot and a predicted locate line 184 is shown as a dashed line. All of these are indicated in relation to a "virtual" locator 10'. To avoid misinterpretation, the cable line symbol on the display of the portable locator differs from the appearance of the locate line. Textual labels may also accompany any of the illustrated items. By simultaneously showing both the cable line and transmitter data, the portable locator of the present invention provides a powerful tool for use in avoiding the hazards of drilling into underground utilities while guiding a boring tool.

A number of possible approaches may be used in order for the locator to distinguish between the signal from the boring tool transmitter and one or more buried cable lines. For example, a different frequency may be used for each item being located or tracked. The same tri-axial receiving antenna 12 (see FIG. 1) may be used to receive all the employed frequencies. A digital signal-processing receiver is used to extract the signal amplitudes for each antenna and frequency. Alternatively, different sets of receiving devices may be used. In any case, a microprocessor is configured for processing the data for display. In the case of AC power cables, the signal naturally emanating from the AC cable may be used as the cable locating signal. If more than one cable is present, however, a different frequency for each cable may be employed. The location data for each cable may be presented alone or in combination with the location data for other cables.

One alternative to multiple frequency use is the use of time multiplexed signals that are synchronized at the locator. Such multiplexing may be used for the cable lines in the ground or may include the boring tool transmitter as well. Combinations of multiple frequencies and time multiplexing are also contemplated.

Because the portable locator and associated method disclosed herein may be provided in a variety of different configurations and modified in an unlimited number of different ways, it should be understood that the present invention may be embodied in many other specific forms without departing from the spirit or scope of the invention. For example, the present teachings are applicable to any type of locating which utilizes a dipole locating field or a cable line type locating field. Therefore, the present examples and methods are to be considered as illustrative and not restrictive, and the invention is not to be limited to the details given herein, but may be modified within the scope of the appended claims.

What is claimed is:

1. A portable locator in a system in which a boring tool is moved through the ground within a given region along a path while transmitting a locating signal having a transmit axis such that the locating signal exhibits locate points at the surface of the ground and a locate line, one of said locate points being ahead of the boring tool and the other one of said locate points being to the rear of the boring tool so as to define a vertical plane including the transmit axis and the locate line is accessible at the surface of the ground and included in a locate plane that extends through the boring tool in a direction normal to the transmit axis, said portable locator comprising:

an antenna for measuring a local flux intensity of the locating signal at an above ground point that is within a region defined between the locate points; and     a processor configured for detecting that the local flux intensity is in a substantially horizontal orientation and, responsive thereto, generating a locate line display.

2. The portable locator of claim 1 wherein said processor is configured for automatically presenting the locate line display when a flux slope of the locating signal is within a pre-selected range.

3. The portable locator of claim 2 wherein the pre-selected range is based on the flux slope approaching +/−90 degrees at the locate line.

4. The portable locator of claim 2 wherein the processor is configured to generate a directional indication toward the locate line based on the flux slope.

5. The portable locator of claim 4 wherein the processor is configured to update the directional indication based on moving the portable locator to a new above ground point.

\* \* \* \* \*